No. 642,931. Patented Feb. 6, 1900.
C. W. SLEEPER.
FLUX FEEDING DEVICE.
(Application filed Apr. 20, 1899.)

(No Model.)

Witnesses.
O'Neil Twitchell
R. J. Brown

Inventor.
Charles W. Sleeper.

UNITED STATES PATENT OFFICE.

CHARLES W. SLEEPER, OF LANCASTER, NEW HAMPSHIRE, ASSIGNOR TO THE SLEEPER MACHINE COMPANY, OF BOSTON, MASSACHUSETTS.

FLUX-FEEDING DEVICE.

SPECIFICATION forming part of Letters Patent No. 642,931, dated February 6, 1900.

Application filed April 20, 1899. Serial No. 713,761. (No model.)

*To all whom it may concern:*

Be it known that I, CHARLES W. SLEEPER, a subject of Her Majesty the Queen of Great Britain, residing at Lancaster, in the county of Coos and State of New Hampshire, have invented a new and useful Flux-Feeding Device, of which the following is a specification.

My invention relates to improvements in flux-feeding devices for use upon soldering-machines in which dry powdered flux—such as resin, sal-ammoniac, or combinations of resin and sal-ammoniac with other ingredients—is fed from a suitable receptacle to and along the joint or seam to be soldered.

The objects of my invention are to provide means for automatically feeding the powdered flux to and along the seam to be soldered and to provide against packing or matting of the flux in the bottom of the feed-box. I accomplish these objects by means of the device illustrated in the accompanying drawings, in which—

Figures 2, 3:
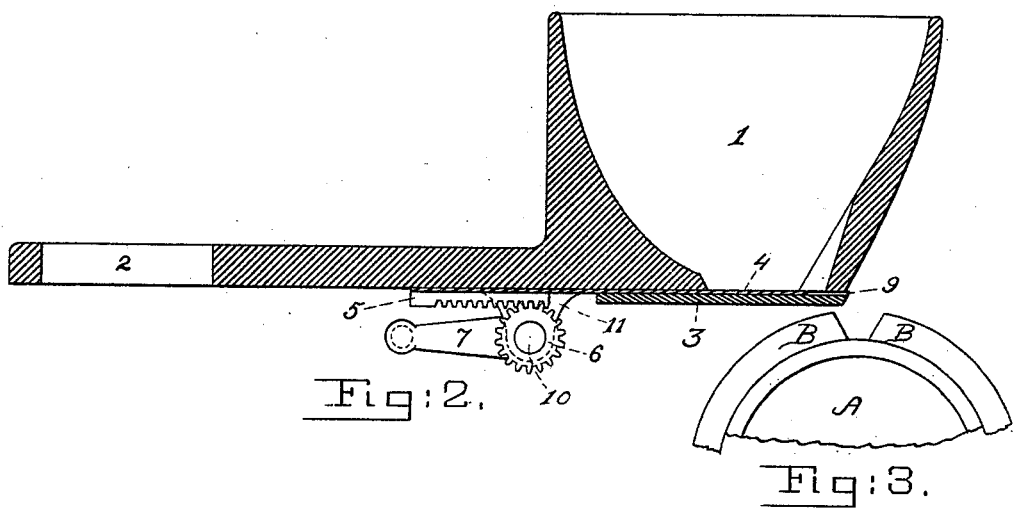
Figure 1:
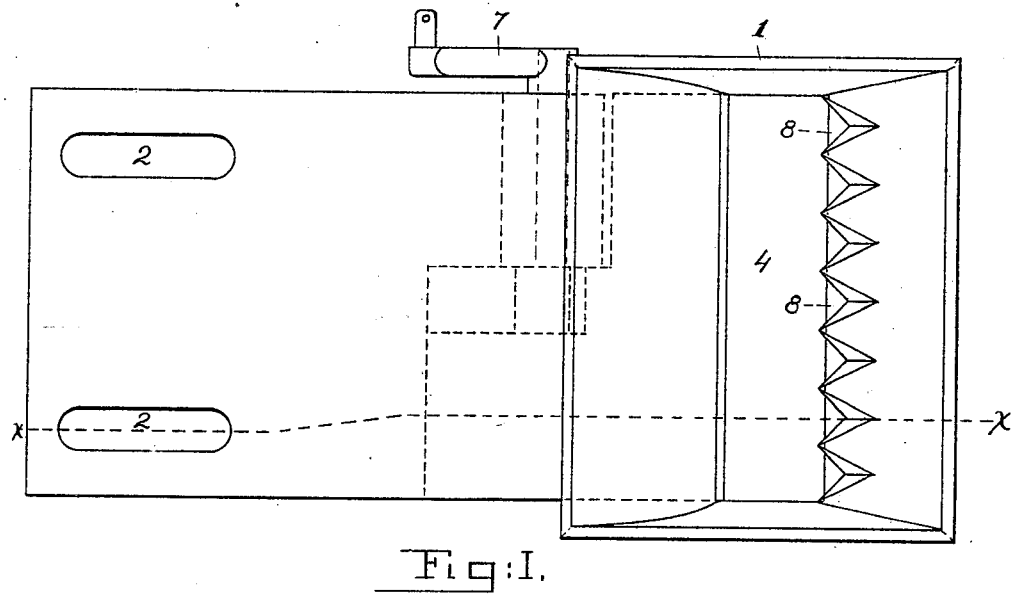

Figure 1 is a plan of my invention. Fig. 2 is a vertical section of the same, taken on line $x\ x$, Fig. 1. Fig. 3 is a partial end view of a can-body former shown in its natural position in relation to the flux-feeding device, Fig. 2.

1 is a flux-box having a projecting web provided with slots 2 2 to receive bolts for securing the box to the machine upon which it is to be used.

3 is a plate secured to and forming the bottom of box 1.

4 is a feed-slide, of thin metal, to which a rack 5 is secured. A channel the width of slide 4 is cut across the upper face of plate 3, forming a slot 9, through which the slide 4 moves freely. The slide 4 rests upon the plate 3, which forms the bottom of the box 1, and is given reciprocating motion by the pinion 6 upon the oscillating shaft 10, journaled in a projection 11 upon the under side of the box 1 and oscillated from a part having a suitable motion in the machine upon which the device is used, the arm 7 being provided to receive a suitable connecting-link (not shown) from such part. The slide 4 should have sufficient motion to cause it to advance from the position shown until it projects through the slot at 9. The reciprocating motion of the slide prevents the flux which rests upon it from packing in the feed-box, and the flux which falls in front of the slide 4 is pushed through the slot 9, where it falls upon the joint to be soldered.

To prevent the flux from packing under the end of the slide 4, I have provided a series of deep recesses 8 8 in the side of the box 1, which allow the flux to fall in front of the slide while the slide is held down by the points between recesses.

What I claim as my invention, and desire to secure by Letters Patent, is—

1. The combination in a flux-feeding device of a box to hold the flux, a slide arranged to rest upon the bottom of the box and pass freely through a slot in the side of the box, and means for withdrawing the slide so that a portion of the flux resting upon the slide may fall down between the end of the slide and the side of the box, and means for pushing the slide forward through the slot in the side of the box, substantially as described and for the purpose set forth.

2. The combination in a flux-feeding device, of a box to hold the flux, of a slide arranged to rest upon the bottom of the box and pass freely through a slot in the side of the box, and means for imparting reciprocating motion to the slide: the side of the box being serrated with deep recesses to allow the flux to fall in front of the slide while the slide is held down by the points between the serrations, substantially as described and for the purpose set forth.

CHARLES W. SLEEPER.

Witnesses:
O'NEIL TWITCHELL,
R. J. BROWN.